United States Patent [19]

Bortfeld

[11] 4,124,087
[45] Nov. 7, 1978

[54] ACTIVATING DEVICES FOR PASSENGER RESTRAINING SYSTEMS IN VEHICLES

[75] Inventor: Manfred Bortfeld, Eching, Fed. Rep. of Germany

[73] Assignee: Bayerische Motoren Werke Aktiengesellschaft, Munich, Fed. Rep. of Germany

[21] Appl. No.: 640,304

[22] Filed: Dec. 12, 1975

[30] Foreign Application Priority Data

Jan. 29, 1975 [DE] Fed. Rep. of Germany ....... 2503565

[51] Int. Cl.² ............................................. B60R 21/00
[52] U.S. Cl. ................................. 180/91; 180/103 A; 200/52 R; 200/82 C; 200/82 D; 200/83 J; 293/2
[58] Field of Search ................. 180/91, 103 A; 293/2, 293/4, 70, 84; 200/82 R, 82 C, 82 D, 83 J, 52 R

[56] References Cited

U.S. PATENT DOCUMENTS

| | | | |
|---|---|---|---|
| 3,619,526 | 11/1971 | Riley | 200/82 C X |
| 3,654,412 | 4/1972 | Haruna | 200/82 D X |
| 3,736,645 | 6/1973 | Fannin | 293/70 |
| 3,789,949 | 2/1974 | Bortfeld | 180/91 |
| 3,830,329 | 8/1974 | Sumida | 180/91 |
| 3,842,222 | 10/1974 | Hogland | 180/91 X |
| 3,862,669 | 1/1975 | Lindbert | 180/91 |
| 3,869,163 | 3/1975 | Dera | 293/84 X |

Primary Examiner—Joseph F. Peters, Jr.
Assistant Examiner—John P. Silverstrim
Attorney, Agent, or Firm—Ladas, Parry, Von Gehr, Goldsmith & Deschamps

[57] ABSTRACT

The invention provides a device for activating a passenger restraining system in a vehicle comprising, a dash-pot assembly arranged to be operatively mounted between the vehicle structure and a bumper on the vehicle, the dash-pot assembly including a cylindrical tube, a closure across the tube and a piston movable in the tube to form with the closure a chamber for pressure fluid in the tube, throttle means in communication with said chamber arranged to control exit of pressure fluid from the chamber and to damp movement of the piston relative to the tube whereby to dissipate energy, and a sensor mounted as an assembly with said tube, the sensor including an electrical switch operable in response to fluid pressure in said chamber.

This arrangement in conjunction with the fact that a dash-pot co-operating with a bumper or fender of a vehicle is one of the first components of the vehicle to be stressed during an impact, provides the advantage of the earliest possible activation of the actuating of an occupant restraining system.

22 Claims, 6 Drawing Figures

ACTIVATING DEVICES FOR PASSENGER RESTRAINING SYSTEMS IN VEHICLES

BACKGROUND OF THE INVENTION

This invention relates to a device for activating an actuating apparatus for an occupant restraining system in automobiles or other vehicles.

In personnel-carrying automobiles, it has been proposed that the bumper or fender is mounted on the vehicle by way of an energy absorbing device of the dash-pot type, and a sensor is provided connected to the occupant restraining system; whereby a fluid pressure medium in the dash-pot is expelled from a chamber through throttles to absorb impact energy of the automobile in the event of an accident, and the sensor is in operative connection with the pressure medium in the chamber which is pressurized during such energy absorption, in order to trigger a control signal to the activating apparatus.

Such a device is known from DT-OS No. 2,242,289. In this device, the sensor is mounted on the vehicle structure separated spatially from the dash-pot. The operative connection of the sensor to the medium in the chamber is obtained through the use of a pipe.

The provision of a pipe is a substantial disadvantage, since a pipe which is not leak-tight or which ruptures at the start of an accident leads to a failure of the occupant restraining system. To cater for such a failure, an additional means, not operated in response to the pressure of the medium of the dash-pot, is necessary for activating the actuating apparatus. This solution is also undesirable.

It is an object of the present invention to overcome these disadvantages.

SUMMARY OF THE INVENTION

Accordingly, the present invention provides a device for activating a passenger restraining system in a vehicle comprising, a dash-pot assembly arranged to be operatively mounted between the vehicle structure and a bumper on the vehicle, the dash-pot assembly including a cylindrical tube, a closure across the tube and a piston movable in the tube to form with the closure a chamber for pressure fluid in the tube, throttle means in communication with said chamber arranged to control exit of pressure fluid from the chamber and to damp movement of the piston relative to the tube whereof to dissipate energy, and a sensor mounted as an assembly with said tube, the sensor including an electrical switch operable in response to fluid pressure in said chamber.

This arrangement in conjunction with the fact that a dash-pot co-operating with a bumper or fender of a vehicle is one of the first components of the vehicle to be stressed during an impact, provides the advantage of the earliest possible activation of the actuating of an occupant restraining system. Consequently, it is possible for the restraining action to be initiated earlier than previously, while a restraining system can be brought into action "more gently or more slowly" as a consequence of the time saving in initial activation. This leads, in a restraining system in the form of an air bag, to an appreciable reduction in the noise shock level as a consequence of the "slower" inflation of the bag.

In order to prevent the sensor from emitting a signal to the actuating device in an impact occurring at a speed which is not dangerous to the occupants of the vehicle, a so-called triggering threshold must be determined for the sensor. This is obtained by the construction of the sensor itself, according to further features of this invention, so that an additional means, for example to determine the rate of vehicle deceleration, is rendered unnecessary.

It is known that in impact energy absorption by means of dash-pots, an enormously high pressure can arise in the fluid medium remaining in the chamber of the dash-pot at a given instant during the impact. With the form of construction according to this invention, whereby the medium acts only indirectly upon the sensor, the sensor can be kept small and is adapted favorably to the mass production of such dash-pots.

BRIEF DESCRIPTION OF THE DRAWINGS

In order to promote a fuller understanding of the above, and other aspects of the present invention, some embodiments will now be described, by way of example only, with reference to the accompanying drawings in which.

DESCRIPTION OF PREFERRED EMBODIMENTS

Figure 1:
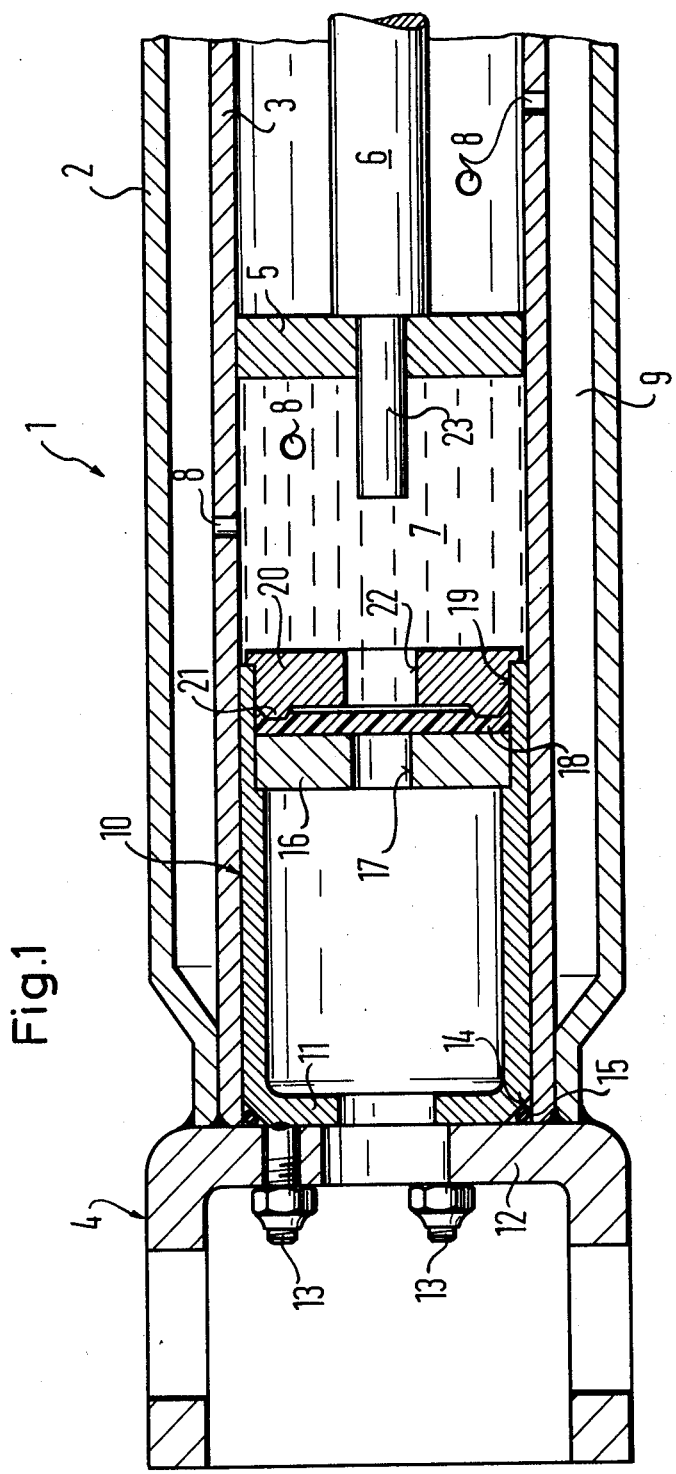
FIG. 1 is a cross-sectional view of a portion of a dash-pot with a sensor mounted in an inner tube thereof.

FIG. 1 shows in longitudinal cross-section a portion of a dash-pot 1, which connects a bumper or fender to the vehicle structure (not shown) in an automobile. The end portion of the dash-pot 1 shown here is preferably the end which is mounted on the vehicle structure. The dash-pot 1 comprises coaxially disposed tubes 2, 3, of which that which is designated 2 is called the outer tube and that designated 3 the inner tube. The outer tube 2 and the inner tube 3 are attached to a U-shaped pivot stirrup 4, by which the dash-pot 1 may be pivoted mounted in conventional manner in the vehicle structure by means of a pin. A piston 5 is disposed inside the inner tube 3, and is connected by a rod 6 to the bumper. The piston 5 is slidably mounted in the tube 3, and defines therein one wall of a chamber 7. If the vehicle strikes an obstruction with its bumper, the piston 5 is displaced inwards by the rod 6 towards the vehicle structure end of the dash-pot 1. In this event a fluid medium inside the chamber 7 is displaced by the piston 5 through throttle aperture 8 disposed in the wall of the inner tube 3 into the chamber 9, to absorb the energy of the impact.

A pot-shaped housing 10 is provided in the cylindrically shaped inner tube 3 and bears with its end 11 against a web 12 of the pivot stirrup 4. The housing 10 is centered in the inner tube 3 by its cylindrical external form and is attached to the web 12 of the pivot stirrup 4 by means of screw-threaded studs 13 which are welded to the base 11 of the housing and pass through the web 12 to be secured therein by nuts. A chamber 14 is formed on the base 11, which, together with a portion of the inner tube 3 and with the web 12, provides an annular space to contain a toroidal seal 15. A pressure-resistant rigid disc 16 is mounted in that end of the housing 10 facing the chamber 7 and forming a closure defining a further wall of the chamber 7, and has, at its center, an aperture 17 therethrough. This aperture 17 is closed, on the side remote from the inner space of the housing 10, by a diaphragm 18, which may be of elastic material. The diaphragm 18 is disc-shaped and has a diameter adapted to the shouldered bore 19 in the end of the housing 10. In order to hold the diaphragm 18 in the bore 19, a shouldered disc 20 having an annular projection 21 is provided, to press the diaphragm 18 both against the end surface of the disc 16 and to squeeze it outwards against the bore 19. Thus the interior space of the housing 10 is sealed from the fluid medium in the chamber 7 by the diaphragm 18. The shouldered disc 20 bears against the end of the housing 10 around the bore 19 in a force-transmitting manner and also has a centrally disposed aperture indicated at 22. The coaxially disposed apertures 17 and 22 are in alignment with a pin 23 which is mounted on the piston 5, in such manner that it can penetrate into the apertures 17 and 22. The detector means which, as discussed below, with the housing 10 forms a sensor for the device is not shown in FIG. 1.

The above described housing 10 is a component of a sensor, which together with the dash-pot 1 constitutes a device for activating an actuating device for an occupant restraining system in an automobile. The sensor, formed by the housing 10 in the dash-pot 1 as a single assembly may include any one of the detector means described below with reference to FIGS. 2 to 6 together with an electrical switch, in operative connection with the detector means, for providing a control or trigger signal to activate the actuating device in the event of collision. Each of the detector means described in more detail below is in operative connection with the medium in the chamber 7 via the diaphragm 18. In order that the pressure obtaining during energy absorption in the medium not yet expelled from the chamber 7 at any instant in time, shall not act entirely upon the detector means, the diaphragm 18 is associated, as pressure or force-transmitting member, with the aperture 17 which has only a relatively small cross-section compared with that of the chamber 7 (drawings not to scale). It is thus possible for the detector means acting upon the switch when a predetermined pressure in the medium is exceeded to be kept advantageously small, which results in a sensor of small overall size. This again is a favorable condition to the combining of a sensor with a mass-produced dash-pot.

Figure 2:
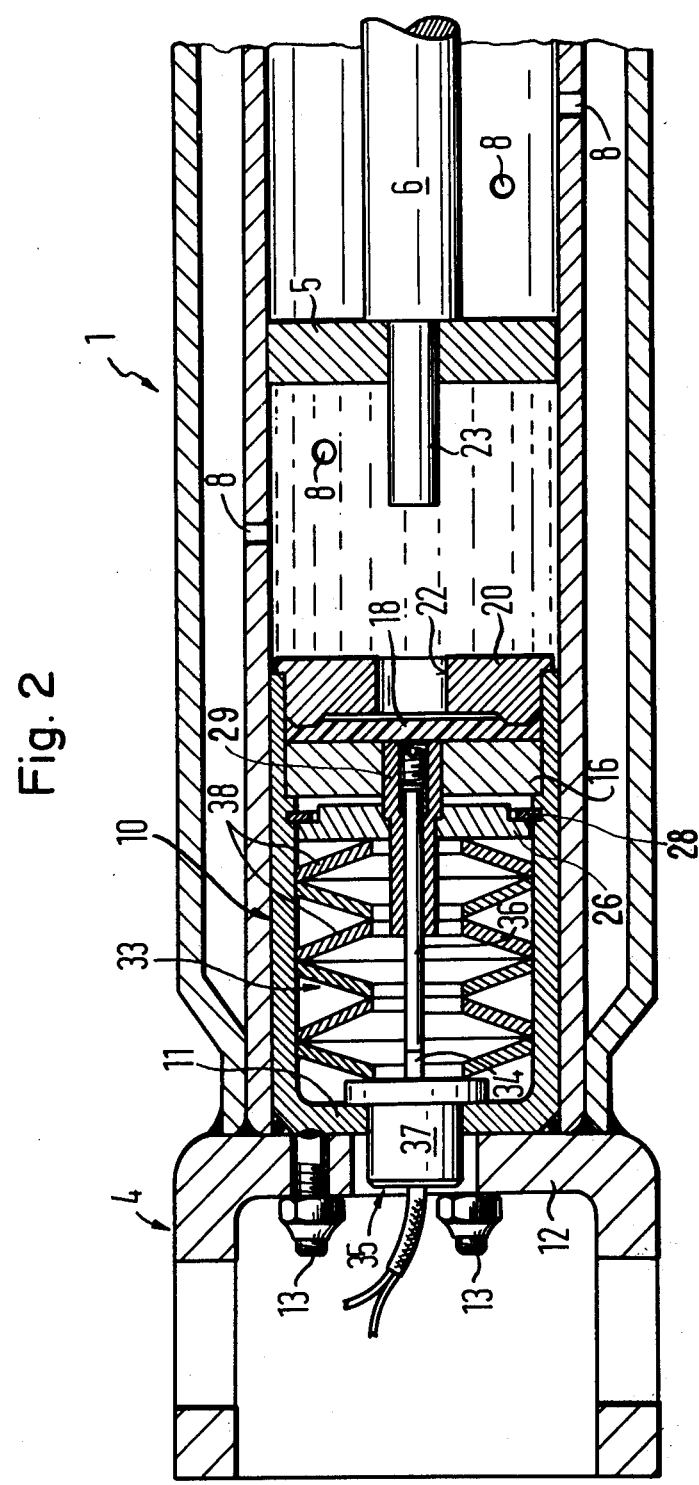
FIGS. 2 to 6 shows various forms of sensors, detector means and switch arrangements for use in the dash-pots of FIGS. 1 and 2.

In the arrangement of FIG. 2, the sensor 33 includes detector means which comprises a piston 26, guided in the housing 10, and a stack of belvil washers 38 acting to bias the piston 26 to the right as seen in FIG. 2. The piston 26, which is restrained by a circlip 28, carries a projection 29 co-operating with the diaphragm 18, and secondly a plunger 36, acting upon an electrical switch 35.

The plunger 36, is constructed to be adjustable in its length to the actuating element 34 of the switch 35. The switch is disposed in a housing 37, comprising a cylindrical portion and a flange, and the switch 35 is mounted in an aperture in the base 11 of the housing 10 by means of the cylindrical portion of the housing 37, and is held there by the flange and by the belvil washers 38 which are pre-loaded, acting upon the end face of the housing 37.

Figure 3:
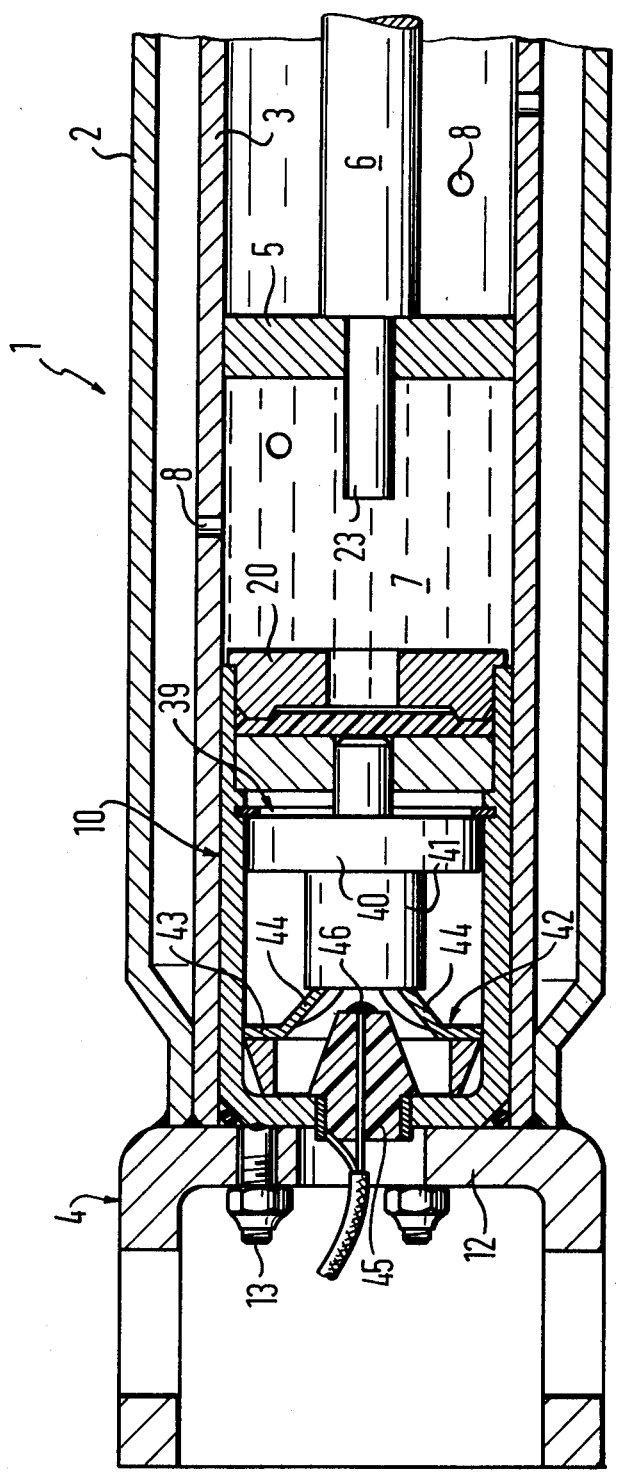

In the arrangement of FIG. 3, the sensor 39 includes a piston 40 which is likewise guided in the housing 10 and includes a plunger 41. A spring element 42 acts on the free end of the plunger 41 and comprises spring lugs 44 extending from a common supporting ring 43 and disposed in a part conical configuration. An electrical contact 46 is mounted upon a base 45 of insulating material opposite to the free end surface of the plunger 41. The plunger 41 is provided as the second contact from an electrical switch for the control circuit.

Figure 4:
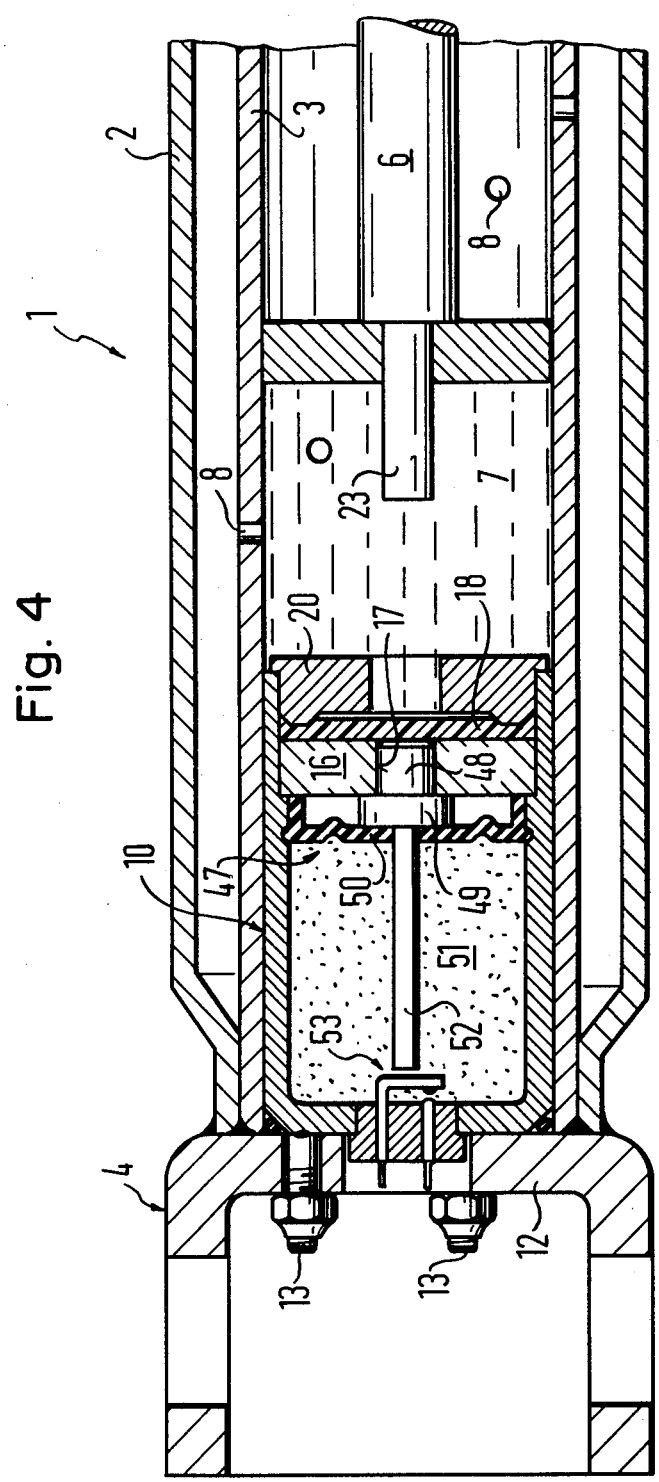

The sensor 47 shown in FIG. 4 includes detector means comprising a piston 48, guided in the aperture 17 of the disc 16 and co-operating with the diaphragm 18. The piston 48 includes a flange 49 which bears against the end surface of the disc 16 which is towards the interior space of the housing 10. The flange 49 of the piston 48 is connected to a diaphragm 50, which extends to the bore of housing 10 to define a chamber 51 which is filled with a compressed gas. By means of a plunger 52, which in this arrangement is formed integrally with the piston 48 and passes in a sealed manner through the diaphragm 50, the piston 48 acts upon a contact bridge 53, constructed as a cranked portion of an electrical conductor to form an electrical switch.

Figure 5:
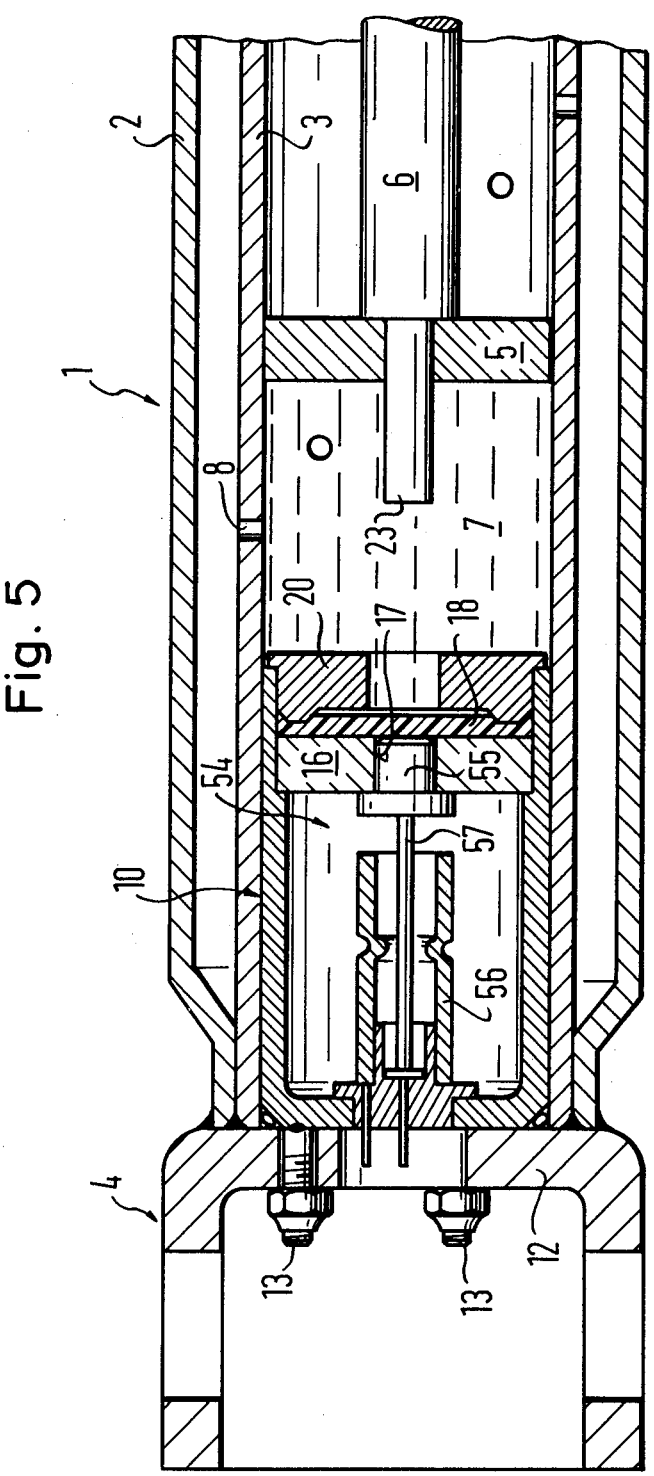

The sensor 54 shown in FIG. 5 includes detector means comprising a piston 55, co-operating with the diaphragm 18, which is likewise disposed in the aperture 17 of the disc 16. This piston is connected to a collapsible bar on "euler" strut 57, coaxially disposed in a sleeve 56. The sleeve 56 and the collapsible strut 57 are each manufactured from elastically conducting material and are connected to the current circuit for the actuating device, so that when the collapsible strut 57 buckles under load from the piston 55 it touches the sleeve 56, thus providing a control signal.

Figure 6:
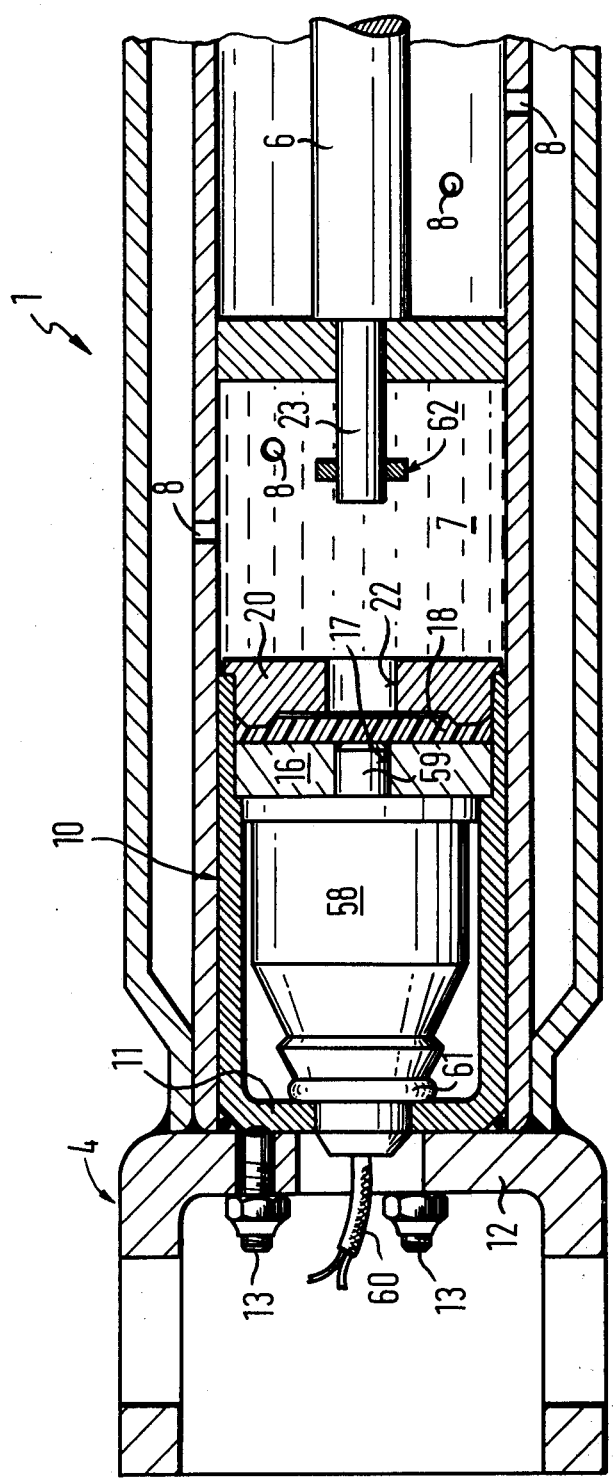

As shown in FIG. 6, a mass-produced encapsulated detector means 58, may be disposed in the housing 10 (as also in the housing 10'). Here, the detector means 58 is in operative connection with the diaphragm 18 via a pressure piece 59 guided in the aperture 17. The detector means 58 is preferably provided with internal resilient biasing means to maintain the pressure piece 59 in the position shown in normal use. The encapsulated detector means 58 may co-operate, at the end from which the control leads 60 are led out, with the housing 10 by means of a rubber cap 61 which can be introduced into the aperture in the base 11 of the housing 10.

With each of the arrangements discussed above, in the event that the pressure medium leaks out of the chamber 7, thus making it impossible for the sensor to be operated by fluid pressure, the pin 23 will pass through the aperture 17 at the end of the dash-pot stroke to mechanically operate the sensor ensuring activation of the restraining system. Further, when there is no medium in the dash-pot chamber 7 as a consequence of a leak, the piston 5 can be moved towards the sensor otherwise than by a dangerous impact setting off the restraining system through the pin 23 engaging the sensor as discussed above. In order to prevent this, the pin 23 is furnished with an abutment 62 (FIG. 6). The abutment 62 may, for example, be a ring frictionally located on the pin 23 as a light press fit, which will engage the end surface of the shouldered disc 20. The frictional abutment ring 62 possesses the advantage, as compared with a "shearing device" disposed in the aperture 22 of the shouldered disc 20 or the pin 23, that when the sensor is actuated by the pin 23, no broken pieces are left in the aperture 22 or the chamber 7.

Within the scope of the invention it is also possible, instead of the diaphragm 18, to provide simply a piston as the pressure force-transmitting member, this piston being disposed in an aperture in a pressure-resistant wall bounding the chamber or in the housing of the sensor with suitable seals operative between the piston and aperture.

Thus it can be seen that the invention provides a dash-pot/sensor construction as a single unit leading to simplicity of assembly and reliability in operation.

We claim:

1. A device for activating a passenger restraining system in a vehicle comprising a dash-pot assembly arranged to be operatively mounted between the vehicle structure and a bumper on the vehicle, the dash-pot assembly including:
   a cylindrical tube;
   an end closure member rigidly attached to one end of said tube;
   a pot-shaped housing disposed within the tube and releasably attached at its bottom end to said end closure member;
   a closure across said tube at the open end of said housing and formed by a rigid disc having an aperture therein of a diameter smaller than that of said tube and a movable sealing element closing said aperture;
   a piston movable in the tube to form with the closure a chamber for pressure fluid in the tube;
   throttle means in communication with said chamber arranged to control exit of pressure fluid from the chamber and to damp movement of the piston relative to the tube whereby to dissipate energy; and
   a sensor mounted in said housing, the sensor including an electrical switch operable in response to movements of said sealing element caused by fluid pressure variations in said chamber.

2. A device according to claim 1, wherein said movable sealing element is an elastic diaphragm in face contact with said disc and sealingly overlying said aperture.

3. A device according to claim 1, wherein said movable sealing element is a sensor piston movable in said aperture in a pressure tight manner, the piston including an operating member arranged to engage and operate said switch in response to the fluid pressure in said chamber and acting on said sensor piston.

4. A device according to claim 3, wherein said operating member is adjustable in length.

5. A device according to claim 3, wherein said closure is mounted in a bore at the open end of said housing.

6. A device according to claim 5, wherein said sealing element further includes an elastic diaphragm positioned over said dics on the side thereof facing said chamber to render said sensor piston fluid pressure tight in said disc.

7. A device according to claim 6, wherein said diaphragm is disc shaped and of a diameter to fit said housing bore, and including a shouldered clamping disc having an aperture in register with the aperture in said disc, disposed in said housing bore to clamp the diaphragm.

8. A device according to claim 5, comprising means for resiliently biasing said sensor piston against fluid pressure in said chamber.

9. A device according to claim 8, wherein the biasing means include a stack of belvil washers positioned in said housing to so bias said sensor piston.

10. A device according to claim 8, a spring element positioned in said housing to so bias said sensor piston, said spring element comprising an annular support ring engaging the housing and a plurality of spring lugs extending in conical formation from that support ring to engage and so bias the sensor piston.

11. A device according to claim 10, including an electrical contact fixedly mounted in and insulated from said housing and said electrical switch is formed by said contact and said sensor piston.

12. A device according to claim 8, wherein the biasing means include a second diaphragm disposed on said sensor piston around said operating member and extending to sealed engagement with said housing to define a further chamber in the housing, said further chamber being filled with gas under pressure to so bias said sensor piston.

13. A device according to claim 8, wherein the biasing means include a resiliently collapsable strut disposed between said sensor piston and said housing to so bias the sensor piston.

14. A device according to claim 13, including an electrically conductive sleeve disposed around said collapsable rod, and mounted in and insulated from said housing and said electrical switch is formed by said sleeve and said rod.

15. A device according to claim 8, wherein said sensor piston includes a flange disposed to engage said rigid disc to retain the sensor piston against force applied by the biasing means.

16. A device according to claim 8, wherein said sensor piston includes an enlarged portion adapted to fit in a further bore in said housing, and said housing includes an annular ring mounted in said further bore to engage said enlarged portion and retain the sensor piston against force applied by the biasing means.

17. A device according to claim 5, wherein said electrical switch and said sensor piston are encapulated in an assembly mounted in said housing.

18. A device according to claim 3, wherein said piston is provided with a projecting rod adapted to enter said aperture in said disc to engage said sensor piston and operate said switch mechanically.

19. A device according to claim 1 wherein said end closure member is the web of a "U"-shaped bracket adapted to operatively connect said dash-pot with said vehicle or said bumper.

20. A device according to claim 1, wherein sid housing is sealed to said end closure member and said tube by means of an annular seal disposed in a space formed between said end closure member, said tube and a chamber on said housing.

21. A device according to claim 1 wherein said end closure member and said housing are formed with aligned openings for electrical wiring to said switch.

22. A device according to claim 1, including an outer tube disposed around and attached to said tube to form a space therearound to receiver pressure medium leaving said throttle means.

* * * * *